US012023925B2

(12) United States Patent
Tozuka et al.

(10) Patent No.: US 12,023,925 B2
(45) Date of Patent: Jul. 2, 2024

(54) LIQUID EJECTION HEAD

(71) Applicant: TOSHIBA TEC KABUSHIKI KAISHA, Tokyo (JP)

(72) Inventors: Takashi Tozuka, Sunto Shizuoka (JP); Minoru Koyata, Mishima Shizuoka (JP); Tsubasa Konishi, Sunto Shizuoka (JP); Noboru Nitta, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 24 days.

(21) Appl. No.: 17/834,601

(22) Filed: Jun. 7, 2022

(65) Prior Publication Data

US 2023/0087927 A1 Mar. 23, 2023

(30) Foreign Application Priority Data

Sep. 22, 2021 (JP) ................................ 2021-154109

(51) Int. Cl.
*B41J 2/14* (2006.01)

(52) U.S. Cl.
CPC ....... *B41J 2/14201* (2013.01); *B41J 2/14209* (2013.01); *B41J 2/1433* (2013.01); *B41J 2002/14419* (2013.01); *B41J 2002/14491* (2013.01); *B41J 2202/08* (2013.01); *B41J 2202/12* (2013.01); *B41J 2202/20* (2013.01)

(58) Field of Classification Search
CPC .. B41J 2/14201; B41J 2/14209; B41J 2/1433; B41J 2002/14419; B41J 2002/14491; B41J 2202/08; B41J 2202/12; B41J 2202/20
See application file for complete search history.

(56) References Cited

U.S. PATENT DOCUMENTS

| | | | | |
|---|---|---|---|---|
| 2003/0156163 | A1* | 8/2003 | Watanabe | H10N 30/80 347/68 |
| 2011/0032311 | A1 | 2/2011 | Miyazawa | |
| 2013/0050338 | A1 | 2/2013 | Shimosato | |
| 2017/0129239 | A1* | 5/2017 | Kubota | B41J 2/162 |
| 2017/0334204 | A1 | 11/2017 | Shimosato | |

OTHER PUBLICATIONS

Extended European Search Report mailed Feb. 1, 2023 in corresponding European Patent Application No. Application No. 22186584. 3, 9 pages.

* cited by examiner

*Primary Examiner* — Yaovi M Ameh
(74) *Attorney, Agent, or Firm* — Kim & Stewart LLP

(57) ABSTRACT

A liquid ejection head includes a plate with a plurality of nozzles arranged along a first direction through which liquid is ejected. A substrate is on the plate and includes a hole extending along the first direction by which the liquid is supplied. An actuator is on the substrate along the hole. The actuator has a plurality of pressure chambers, from which the liquid from the hole is ejected by the nozzles, and a plurality of air chambers. Each air chamber is between two of the pressure chambers that are adjacent to each other. A plurality of individual electrodes is formed on the substrate and each is connected to a corresponding one of the pressure chambers. A common electrode is formed on the substrate and an inner peripheral surface of the hole.

18 Claims, 8 Drawing Sheets

LIQUID EJECTION HEAD

CROSS-REFERENCE TO RELATED APPLICATION

This application is based upon and claims the benefit of priority from Japanese Patent Application No. 2021-154109, filed Sep. 22, 2021, the entire contents of which are incorporated herein by reference.

FIELD

Embodiments described herein relate generally to a liquid ejection head and a liquid ejection device.

BACKGROUND

A liquid ejection head of a known type has a plurality of partition walls that are formed at fixed intervals and an actuator formed of piezoelectric ceramics. There are ink flow paths between adjacent partition walls provided on a substrate made of ceramic. A driving electrode is formed on a side surface of each partition wall. In such a liquid ejection head, an end surface of the partition wall is formed as an inclined surface extending outward from the top to the bottom thereof, and a leader wire of the driving electrode is formed on the inclined surface of the partition wall and a portion of the substrate. Such a liquid ejection head is, for example, an ink jet head that ejects ink.

In order to speed up the ejection of the liquid, a liquid ejection head using an independent drive structure with a pressure chamber for ejecting the liquid from a nozzle and an air chamber for not ejecting the liquid is also known. In the liquid ejection head having an independent drive structure, electrodes of pressure chambers are bundled near the center of the substrate to form a common electrode, and electrodes of non-ejecting air chambers are led out towards the driver IC side.

However, in such a liquid ejection head, if the liquid is ejected by simultaneously driving all the nozzles, the drive waveform effectively differs between an end portion and a center portion of the nozzles arranged in a row, and print quality, such as printed dot diameter and linearity deteriorates.

DETAILED DESCRIPTION

Embodiments provide a liquid ejection head capable of suppressing deterioration of print quality even if a common electrode is used.

In general, according to one embodiment, a liquid ejection head includes a plate having a plurality of nozzles arranged along a first direction. The liquid ejection head further includes a substrate on the plate and has a hole extending along the first direction and through which liquid is supplied for ejection from the nozzles. The liquid ejection head further includes a first actuator on the substrate along the hole. The first actuator has a plurality of pressure chambers, from which the liquid is ejected through the nozzles, and a plurality of air chambers. Each air chamber is disposed between two of the pressure chambers that are adjacent to each other. The liquid ejection head further includes a plurality of individual electrodes formed on the substrate and each is connected to a corresponding one of the pressure chambers. The liquid ejection head further includes a common electrode formed on the substrate and an inner peripheral surface of the hole.

Hereinafter, a liquid ejection head 1 and a liquid ejection apparatus 2 incorporating the liquid ejection head 1 will be described with reference to FIGS. 1 to 9.

Figure 1:
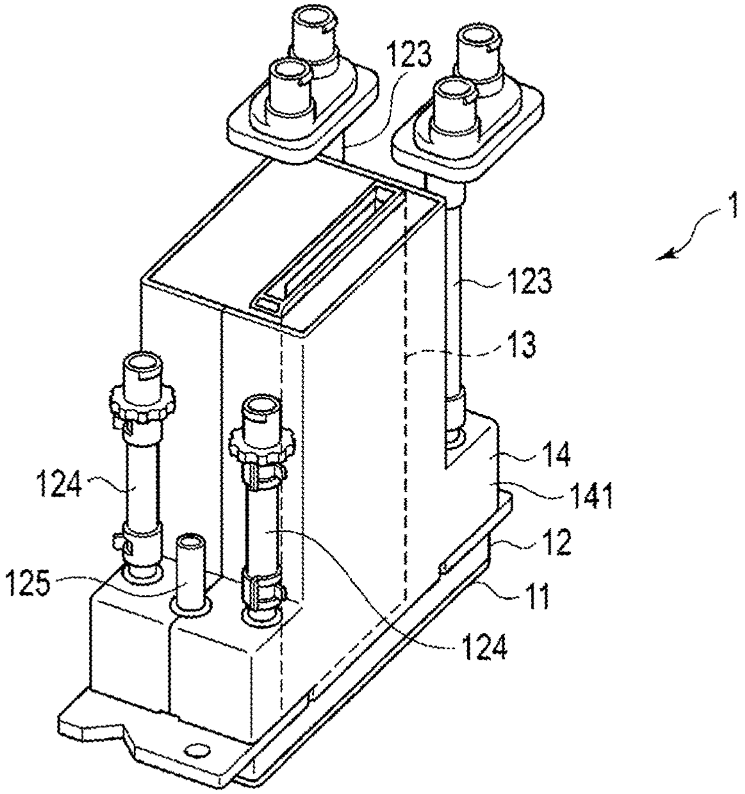
FIG. 1 is a perspective view illustrating a liquid ejection head according to a first embodiment.
Figure 2:
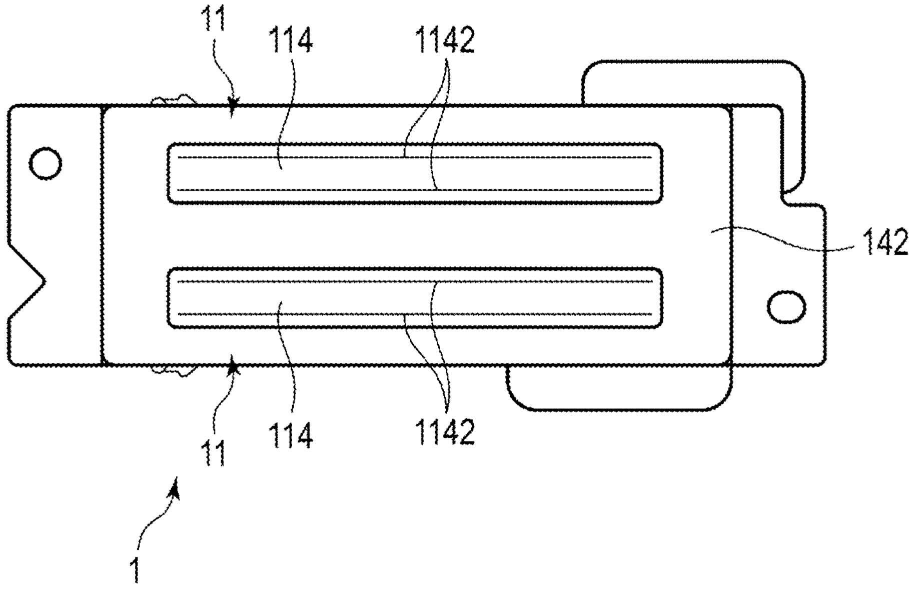
FIG. 2 is a bottom view of a liquid ejection head.
Figure 3:
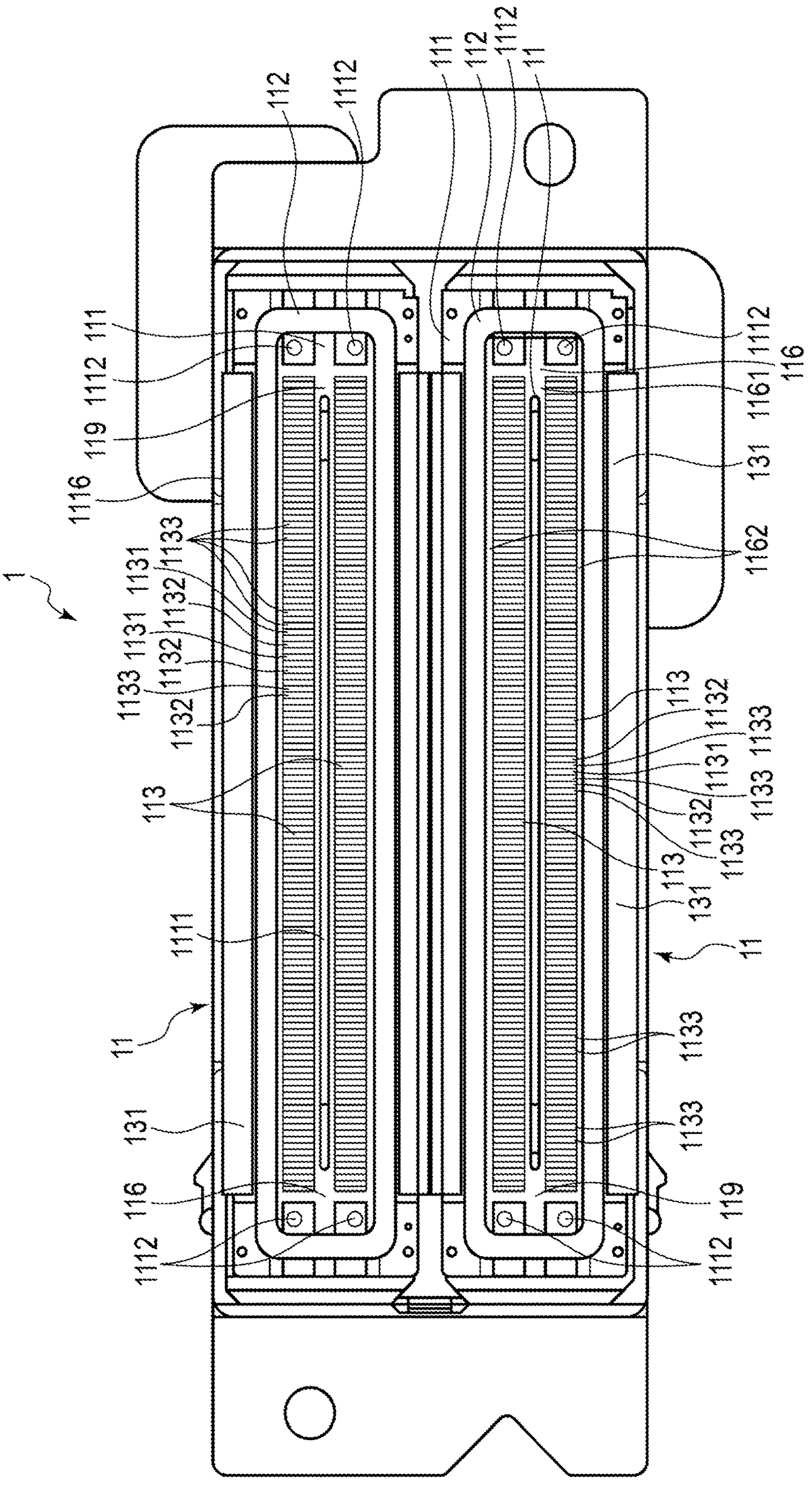
FIG. 3 is a detailed bottom view of a liquid ejection head.
Figure 4:
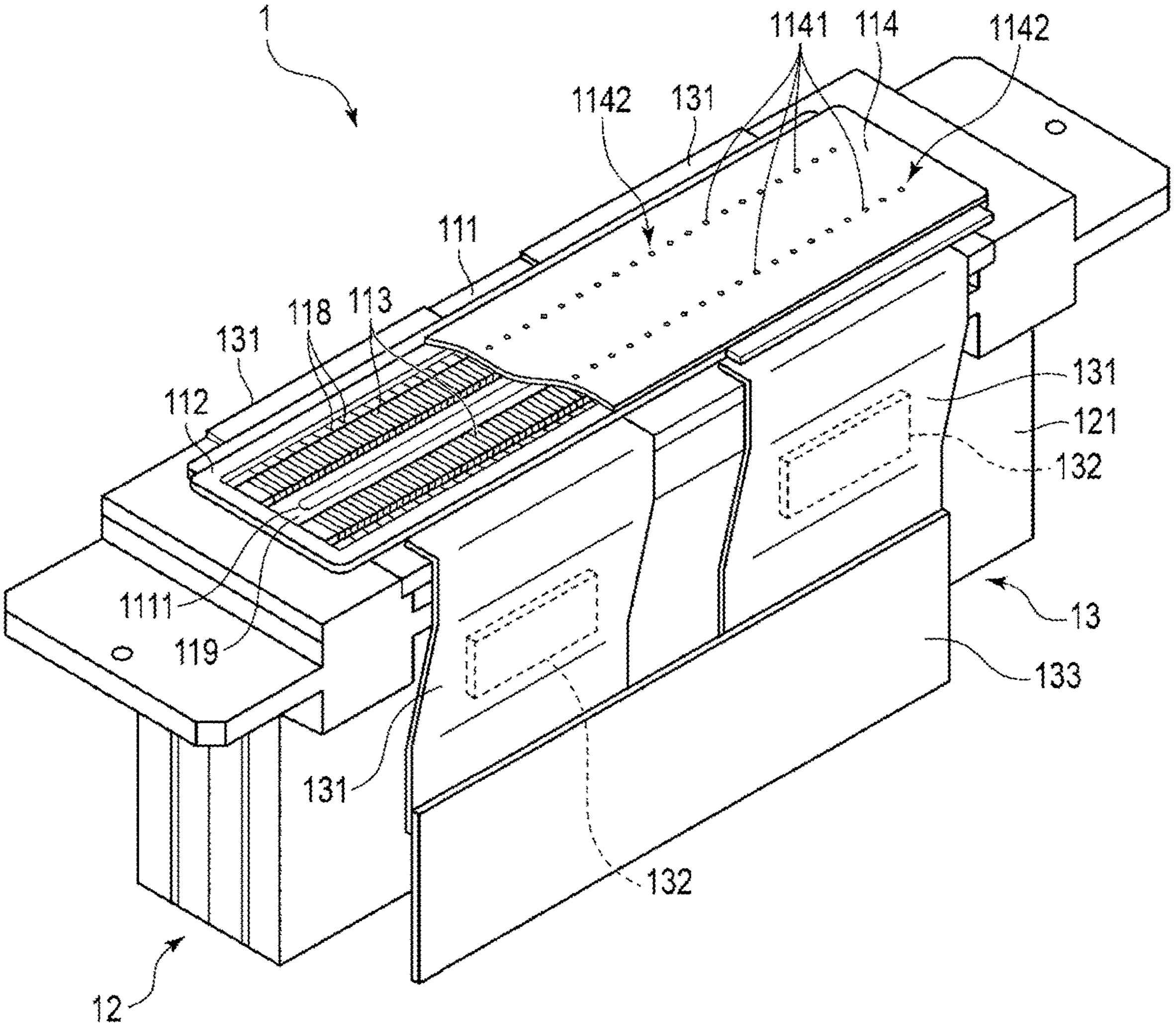
FIG. 4 is a perspective view of a head body of a liquid ejection head.
Figure 5:
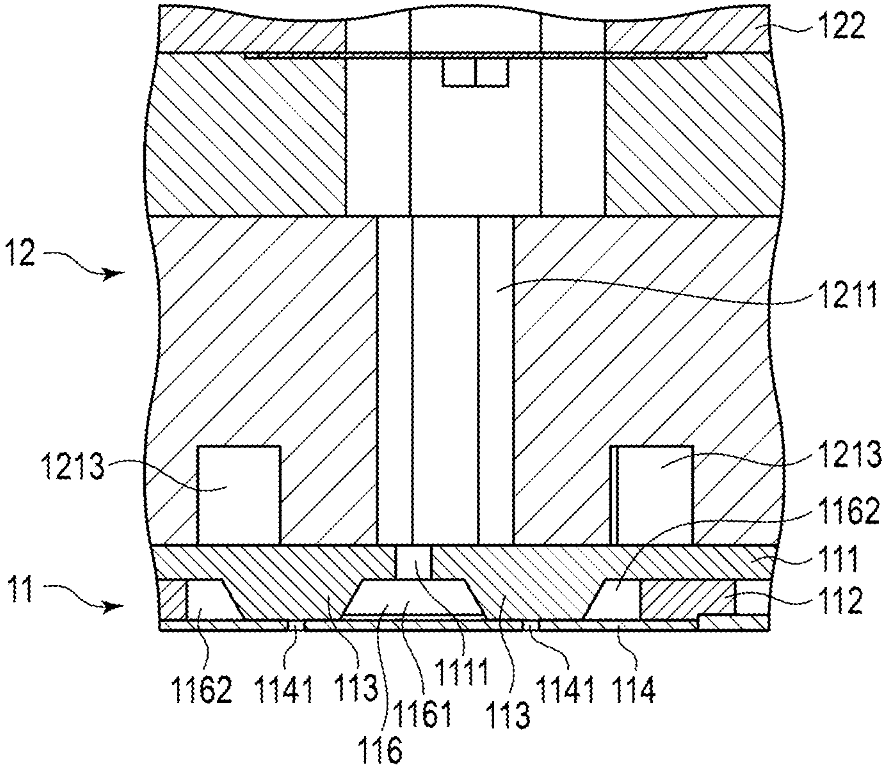
FIG. 5 is a cross-sectional view illustrating a head body of a liquid ejection head.
Figure 6:
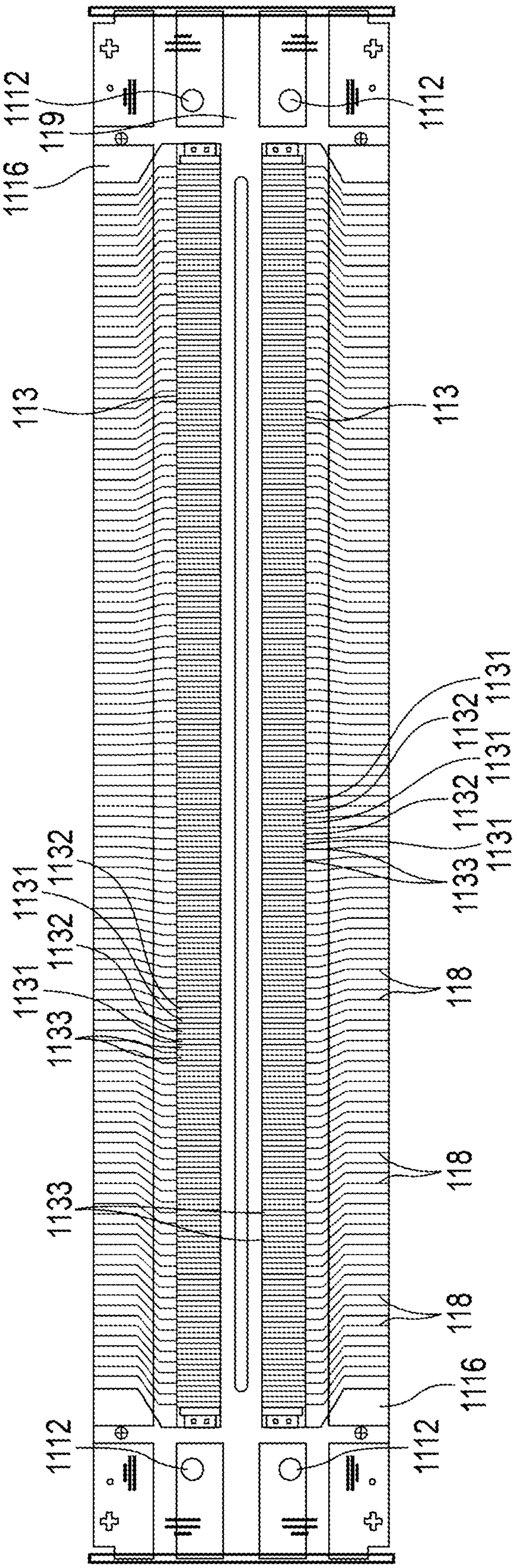
FIG. 6 is a plan view of a head body of a liquid ejection head.
Figure 7:
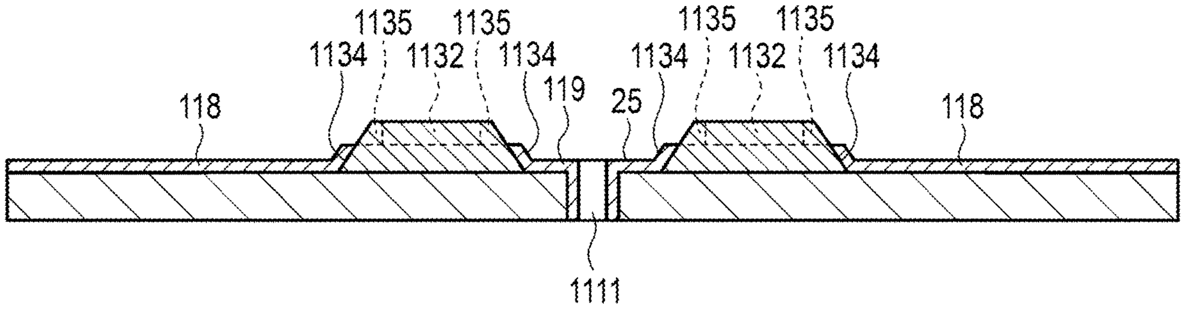
FIG. 7 is a cross-sectional view of a head body of a liquid ejection head.
Figure 8:
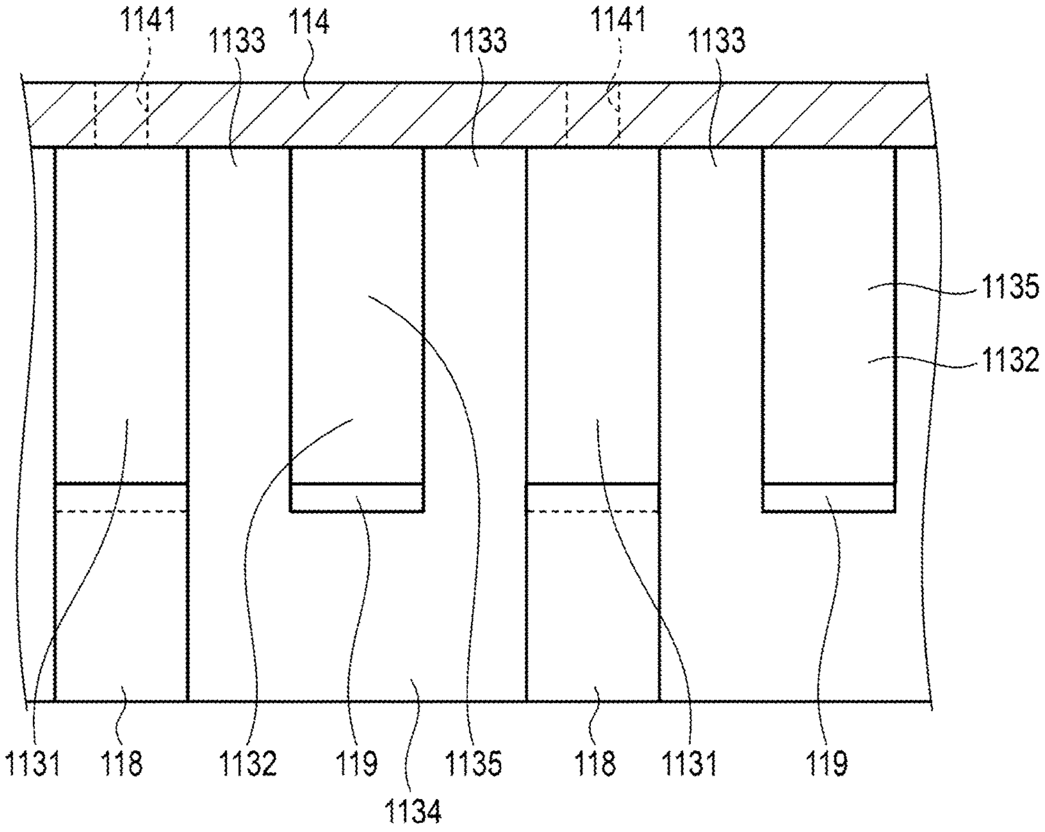
FIG. 8 is a cross-sectional view of a head body of a liquid ejection head.
Figure 9:
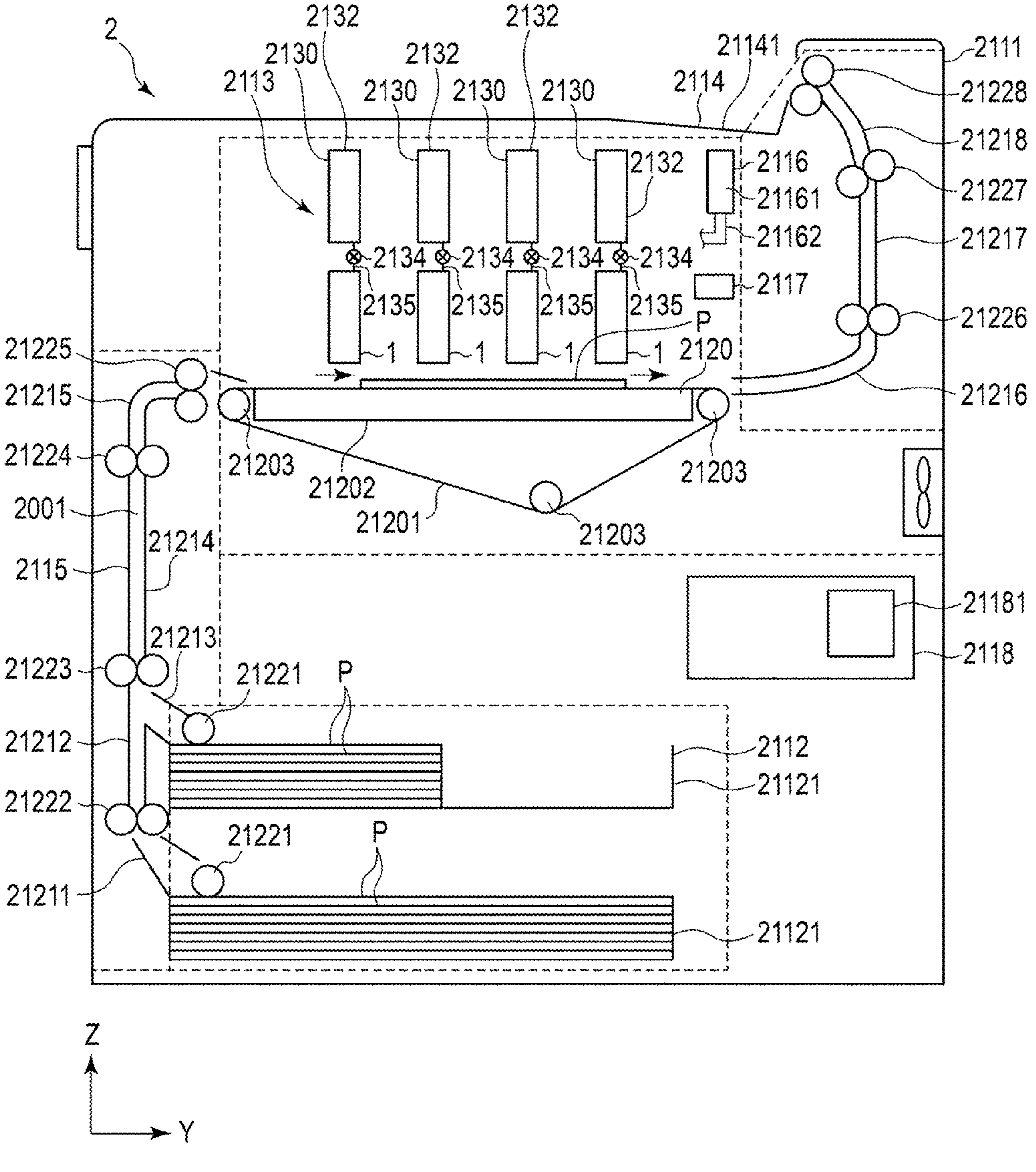
FIG. 9 is a schematic diagram illustrating a liquid ejection apparatus.

FIG. 1 is a perspective view illustrating the liquid ejection head 1 according to the first embodiment, and FIG. 2 is a bottom view of the liquid ejection head 1. FIG. 3 is a bottom view of the liquid ejection head 1 in which a nozzle plate 114 is not illustrated. FIG. 4 is a perspective view of a head body 11 of the liquid ejection head 1 in which a part of the nozzle plate 114 is cut away, and FIG. 5 is a cross-sectional view of the head body 11. FIG. 6 is a plan view of a substrate 111, actuators 113, and a plurality of individual electrodes 118 and a common electrode 119 of the head body 11. FIG. 7 is a cross-sectional view of the substrate 111, the actuators 113, and the plurality of individual electrodes 118 and the common electrode 119 of the head body 11. FIG. 8 is a cross-sectional view of the actuator 113 and the plurality of individual electrodes 118 and common electrodes 119 of the head body 11. FIG. 9 is a schematic diagram illustrating the liquid ejection apparatus 2 having the liquid ejection head 1. For the sake of description in each figure, one or more components are illustrated enlarged, reduced, or omitted as appropriate.

The liquid ejection head 1 is a share mode ink jet head provided in the liquid ejection apparatus 2 such as an ink jet printing apparatus illustrated in FIG. 9, for example. The liquid ejection head 1 is provided in a head unit 2130 including a supply tank 2132 as a liquid storage unit provided in the liquid ejection apparatus 2.

Ink as a liquid stored in the supply tank 2132 is supplied to the liquid ejection head 1. The liquid ejection head 1 may be a non-circulating type head that does not circulate ink, or may be a circulating type head that circulates ink. In this embodiment, the liquid ejection head 1 of the non-circulating type head will be described. The liquid ejection head 1 is connected to a temperature control device 2116 provided in the liquid ejection apparatus 2, and a temperature control liquid (e.g., water) for controlling the temperature of the ink is supplied thereto.

As illustrated in FIGS. 1 to 4, the liquid ejection head 1 includes the head body 11, a manifold unit 12, a circuit board 13, and a cover 14. For example, the liquid ejection head 1 is a side shooter type, four-row integrated structure head including two sets of head bodies 11 each having a pair of actuators 113.

The head body 11 ejects a liquid. As illustrated in FIGS. 3 to 8, the head body 11 includes the substrate 111, a frame body 112, an actuator 113 having a plurality of pressure chambers 1131 and a plurality of air chambers 1132, and the nozzle plate 114.

The head body 11 includes a common liquid chamber 116 that communicates with the plurality of pressure chambers 1131 of the actuator 113. The primary side of the plurality of pressure chambers 1131 is an upstream side of the plurality of pressure chambers 1131 in a direction in which the liquid flows. The secondary side of the plurality of pressure chambers 1131 is a downstream side of the plurality of pressure chambers 1131 in the direction in which the liquid flows.

The head body 11 includes a plurality of individual electrodes 118 for driving the plurality of pressure chambers 1131 of the actuator 113 and a single or a plurality of common electrodes 119 that simultaneously drive the plurality of pressure chambers 1131 on the substrate 111 and the actuator 113.

In this embodiment, the head body 11 includes two actuators 113, and the common liquid chamber 116 includes one first common liquid chamber 1161 and two second common liquid chambers 1162. For example, the first common liquid chamber 1161, communicates with openings on the primary side of the plurality of pressure chambers 1131 of the actuator 113 (i.e., inlets of the pressure chambers 1131), and the second common liquid chamber 1162 communicates with openings on the secondary side (i.e., outlets of the pressure chambers 1131) of the plurality of pressure chambers 1131 of the actuator 113.

The substrate 111 is formed in a rectangular plate shape by, for example, a ceramic material. The substrate 111 is formed, for example, in a rectangular shape that is long in one direction. A wiring pattern that is a part of the plurality of individual electrodes 118 and a wiring pattern that is a part of the single common electrode 119 are formed on one surface of the substrate 111. A pair of actuators 113 are provided on one surface of the substrate 111 so as to be aligned in the lateral direction of the substrate 111. The substrate 111 has a single supply port 1111 and a plurality of discharge ports 1112. The supply port 1111 and the discharge ports 1112 are through-holes penetrating the substrate 111.

The supply port 1111 is an inlet for supplying ink to the first common liquid chamber 1161. The supply port 1111 is a through-hole formed in the center of the substrate 111 in the lateral direction. The supply port 1111 extends along the longitudinal direction of the substrate 111. In other words, the supply port 1111 is, for example, a long hole along the longitudinal direction of the actuator 113 and the longitudinal direction of the first common liquid chamber 1161. The supply port 1111 is provided between the pair of actuators 113 and opens at a position facing the first common liquid chamber 1161.

The discharge port 1112 is an outlet for discharging ink from the second common liquid chamber 1162. A plurality of discharge ports 1112, for example, four discharge ports, are provided. Each discharge port 1112 is located, for example, between the first common liquid chamber 1161 and each second common liquid chamber 1162, and is adjacent to each of both ends in the longitudinal direction of each of the pair of actuators 113. The plurality of discharge ports 1112 may be provided in the second common liquid chamber 1162.

The frame body 112 is fixed to one main surface of the substrate 111 with an adhesive or the like. The frame body 112 surrounds the supply port 1111, the plurality of discharge ports 1112, and the actuator 113 that are provided on the substrate 111.

For example, the frame body 112 is formed in a rectangular frame shape to form an opening along the longitudinal direction of the frame body 112. The pair of actuators 113, the supply port 1111 and four discharge ports 1112 are disposed in the opening of the frame body 112.

The pair of actuators 113 are adhered to a mounting surface of the substrate 111. The pair of actuators 113 are provided on the substrate 111 to be aligned in two rows with the supply port 1111 interposed therebetween. The actuator 113 is formed in a plate shape that is long in one direction. The actuator 113 is disposed in the opening of the frame body 112 and adhered to the main surface of the substrate 111.

As illustrated in FIGS. 5 to 8, the actuator 113 includes the plurality of pressure chambers 1131 disposed at equal intervals in the longitudinal direction and the air chambers 1132 disposed at equal intervals in the longitudinal direction and disposed between adjacent pressure chambers 1131 on the central side in the longitudinal direction. In other words, the plurality of pressure chambers 1131 and air chambers 1132 are alternately disposed in the actuator 113 along the longitudinal direction.

The surface of the actuator 113 opposite to the substrate 111 is adhered to the nozzle plate 114. The actuators 113 are disposed to be aligned at equal intervals in the longitudinal direction, and each of the actuators 113 is formed with a plurality of grooves along a direction orthogonal to the longitudinal direction. The plurality of grooves form the plurality of pressure chambers 1131 and the plurality of air chambers 1132. In other words, the actuator 113 includes a plurality of piezoelectric bodies 1133 which are drive elements disposed to be aligned at equal intervals in the longitudinal direction and are walls forming the grooves therebetween. The plurality of piezoelectric bodies 1133 form the plurality of pressure chambers 1131 and the plurality of air chambers 1132 between adjacent piezoelectric bodies 1133, and a volume of the pressure chamber 1131 is changed according to a driving voltage applied to the piezoelectric bodies 1133.

For example, a width of the actuator 113 in the lateral direction gradually increases from the top side toward the substrate 111 side. A cross-sectional shape of the actuator 113 is formed into a trapezoidal shape. That is, the actuator 113 has an inclined surface 1134 that is inclined to form a side surface portion in the lateral direction. The side surface portion (i.e., the inclined surface 1134) is disposed so as to face the first common liquid chamber 1161 and the second common liquid chamber 1162.

As a specific example, the actuator 113 is formed of a laminated piezoelectric member obtained by bonding two pieces of piezoelectric materials having a rectangular plate shape long in one direction so as to face each other so that polarization directions of the two pieces of piezoelectric materials are opposite to each other. Here, the piezoelectric material is, for example, lead zirconate titanate (PZT). The actuator 113 is adhered to the mounting surface of the substrate 111 by, for example, a thermosetting epoxy adhesive. Then, the actuator 113 is cut to form the inclined surface 1134, for example. In addition, the surfaces of the substrate 111 and the actuator 113 on which the plurality of individual electrodes 118 and common electrodes 119 are patterned are polished. In the actuator 113, for example, a plurality of grooves forming the plurality of pressure chambers 1131 and the plurality of air chambers 1132 are formed, and the piezoelectric bodies 1133 (i.e., the drive elements) which are side walls partitioning adjacent grooves are formed.

On the actuator 113, a wiring pattern that is a part of the plurality of individual electrodes 118 and a wiring pattern that is a part of the single or the plurality of common electrodes 119 are formed.

The pressure chamber 1131 is deformed during operations such as printing by the liquid ejection head 1, so that ink is ejected from the nozzle 1141. The pressure chamber 1131 has an inlet that opens to the first common liquid chamber 1161 and an outlet that opens to the second common liquid chamber 1162. Ink flows into the pressure chamber 1131 from the inlet and ink flows out from the outlet of the pressure chamber 1131. The pressure chamber 1131 may be configured such that ink flows in from both openings described as the inlet and the outlet.

As illustrated in FIG. 7, the air chamber 1132 is separated from each of the first common liquid chamber 1161 and the second common liquid chamber 1162 by a liquid barrier wall 1135 formed of a photosensitive resin or the like. As a specific example, the liquid barrier wall 1135 of the air chamber 1132 is formed by pouring an ultraviolet curable resin into the groove forming the air chamber 1132 and then irradiating a necessary portion, for example, both ends, which are the inlet and outlet sides of the groove, with ultraviolet rays using a mask plate or the like. Such a liquid barrier wall 1135 prevents ink from entering the air chamber 1132. The air chamber 1132 is also sealed by the nozzle plate 114, and the nozzle 1141 is not disposed therein. Therefore, ink does not flow into the air chamber 1132.

The nozzle plate 114 is formed in a plate shape. The nozzle plate 114 is fixed to the main surface of the frame body 112 on the side opposite to the substrate 111 with an adhesive or the like. The nozzle plate 114 has a plurality of nozzles 1141 formed at positions facing the plurality of pressure chambers 1131. In this embodiment, the nozzle plate 114 includes two rows of nozzles 1142 in which a plurality of nozzles 1141 are aligned in one direction.

The first common liquid chamber 1161 is formed between the central sides of the pair of actuators 113 except for both ends of the pair of actuators 113, and forms an ink flow path from the supply port 1111 to the openings (i.e., inlets) on the primary side of the plurality of pressure chambers 1131 of each actuator 113. The first common liquid chamber 1161 extends along the longitudinal direction of the actuator 113.

Each of the second common liquid chambers 1162 is formed between each actuator 113 and the frame body 112. Each of the second common liquid chambers 1162 forms an ink flow path from the openings (i.e., outlets) on the secondary side of the plurality of pressure chambers 1131 to the discharge port 1112. The second common liquid chambers 1162 extend along the longitudinal direction of the actuator 113.

Through the plurality of individual electrodes 118, a driving voltage is applied to the plurality of piezoelectric bodies 1133 which are piezoelectric bodies. The plurality of individual electrodes 118 individually deform the pressure chambers 1131. The individual electrodes 118 are formed by a wiring pattern formed on the substrate 111 and a wiring pattern formed on the actuator 113.

As a specific example, as illustrated in FIGS. 7 and 8, the plurality of individual electrodes 118 are formed on the inner surface of each pressure chamber 1131, the inclined surface 1134 of the actuator 113, and the substrate 111. Specifically, the individual electrode 118 is formed on the surface of the piezoelectric body 1133 forming the pressure chamber 1131 and a part of a piezoelectric member forming the bottom of the pressure chamber 1131. The individual electrode 118 is formed on, for example, the inclined surface 1134 and the polished surface of the substrate 111. The individual electrode 118 extends from the inside of the pressure chamber 1131 to an end portion of the substrate 111 in the lateral direction, and an end portion of the individual electrode 118 is disposed at a connection portion 1116 to which the circuit board 13 of the substrate 111 is connected. The individual electrode 118 is provided so as to be in close contact with the bottom of the pressure chamber 1131 and the surface of the piezoelectric member forming the piezoelectric body 1133. The individual electrode 118 is formed of, for example, a nickel thin film. The individual electrode 118 is not limited to the nickel thin film, and may be formed of, for example, a thin film of gold or copper. The thickness of the individual electrode 118 is, for example, 0.5 μm to 5 μm.

Through the common electrode 119, the same drive voltage is applied to all of the plurality of piezoelectric bodies 1133. The common electrode 119 deforms the plurality of pressure chambers 1131 at the same time. The common electrode 119 is formed by the wiring pattern formed on the substrate 111 and the wiring pattern formed on the actuator 113. The common electrode 119 is a wiring pattern provided from the inner peripheral surface of the supply port 1111 of the substrate 111 to the piezoelectric body 1133 forming the plurality of air chambers 1132. The common electrode 119 is connected to the circuit board 13.

As a specific example, as illustrated in FIGS. 7 and 8, the common electrode 119 is formed on the substrate 111 while avoiding the inner surface of each air chamber 1132, the inclined surface 1134 of the actuator 113, and a region where the individual electrodes 118 are formed. Specifically, the common electrode 119 is formed on the surface of the piezoelectric body 1133 forming each air chamber 1132 and a part of the piezoelectric member configuring the bottom of the air chamber 1132. The common electrode 119 is provided on the inclined surface 1134 from the inside of each air chamber 1132 toward the center of the substrate 111, and is formed on the polished surface of the substrate 111 between the pair of actuators 113 and on the inner peripheral surface of the supply port 1111. The common electrode 119 extends to the end portion of the substrate 111 in the lateral direction, and the end portion of the common electrode 119 is disposed at the connection portion 1116 to which the circuit board 13 of the substrate 111 is connected.

In other words, the common electrode 119 is provided at the center of the substrate 111 in the lateral direction between the connection portion 1116 formed at the end portion of the substrate 111 in the lateral direction and the pair of actuators 113. As illustrated in FIG. 7, a part of the common electrode 119 provided at the center of the substrate 111 in the lateral direction is provided on the inner peripheral surface of the supply port 1111 at the center of the substrate 111 in the lateral direction so as to extend in the thickness direction of the substrate 111. Apart of the common electrode 119 is provided on the surface the piezoelectric member forming each air chamber 1132 from the center of the substrate 111 in the lateral direction.

The common electrode 119 is provided so as to be in close contact with the bottom of the air chamber 1132 and the surface of the piezoelectric member forming the piezoelectric body 1133. The common electrode 119 is formed of, for example, a nickel thin film. The common electrode 119 is not limited to the nickel thin film, and may be formed of, for example, a thin film of gold or copper. The thickness of the common electrode 119 is, for example, 0.5 μm to 5 μm.

For example, the common electrode 119 is covered with an adhesive that adheres the frame body 112 to the substrate 111 on the lower surface of the frame body 112.

As illustrated in FIGS. 1, 2, 4, and 5, the manifold unit 12 includes a manifold 121, a top plate 122, an ink supply pipe 123, an ink discharge pipe 124, and a temperature control water supply pipe 125 (which is paired with a temperature control water discharge pipe of the manifold unit 12 on the opposite side, for example). The numbers of and positions of the ink supply pipes 123, the ink discharge pipes 124, the temperature control water supply pipes 125, and the temperature control water discharge pipes can be appropriately varied.

The manifold 121 is formed in a plate shape or a block shape. As illustrated in FIG. 5, the manifold 121 includes a supply flow path 1211, which communicates with the supply port 1111 of the substrate 111 and forms a liquid supply flow path, a discharge flow path, which communicates with the discharge port 1112 of the substrate 111 and forms a liquid discharge flow path, and a temperature control flow path 1213 which forms a fluid flow path for temperature control.

One main surface of the manifold 121 is fixed to the main surface of the substrate 111. The top plate 122 is fixed to a surface of the manifold 122 opposite to the main surface to which the substrate 111 is fixed. For example, the ink supply pipe 123, the ink discharge pipe 124, the temperature control water supply pipe 125, and the temperature control water discharge pipe are fixed to the manifold 121 via the top plate 122.

The supply flow path 1211 is a flow path formed in the manifold 121 by holes and grooves. The supply flow path 1211 fluidly connects the ink supply pipe 123 and the supply port 1111 of the substrate 111.

The discharge flow path is a flow path formed in the manifold 121 by holes and grooves. The discharge flow path fluidly connects the ink discharge pipe 124 and the discharge port 1112 of the substrate 111.

The temperature control flow path 1213 is a flow path formed in the manifold 121 by holes and grooves. The temperature control flow path 1213 fluidly connects the temperature control water supply pipe 125 and the temperature control water discharge pipe.

The ends of the temperature control flow path 1213 are openings connected to the temperature control water supply pipe 125 and the temperature control water discharge pipe provided on one surface of the manifold 121. The temperature control flow path 1213 is formed for heat exchange with the substrate 111 fixed to the manifold 121.

The top plate 122 is provided on the surface of the manifold 121 opposite to the surface on which the substrate 111 is provided. The top plate 122 covers the manifold 121 to seal the supply flow path 1211, the discharge flow path, and the temperature control flow path 1213.

The top plate 122 has an opening for connecting the pipes 123, 124, and 125, and communicating with the pipes 123, 124, and 125 and the flow paths 1211 and 1213.

The ink supply pipe 123 is connected to the supply flow path 1211. The ink discharge pipe 124 is connected to the discharge flow path. The temperature control water supply pipe 125 is connected to the primary side of the temperature control flow path 1213, and the and the temperature control water discharge pipe is connected to the secondary side.

As illustrated in FIG. 4, the circuit board 13 includes a plurality of wiring films 131 of which one end is connected to the connection portion 1116 of the substrate 111, a driver IC 132 mounted on each of the wiring films 131, and a printed wiring board 133 mounted on the other end of the plurality of wiring films 131.

The circuit board 13 drives the actuator 113 by applying a drive voltage to a wiring pattern of the actuator 113 by the driver IC 132 to increase or decrease the volume of the pressure chamber 1131 and eject droplets from the nozzle 1141.

Each wiring film 131 is connected to the plurality of individual electrodes 118 and common electrodes 119. For example, the wiring film 131 is an anisotropic conductive film (ACF) fixed to a connection portion of the substrate 111 by thermos-compression bonding or the like. A plurality of wiring films 131 to be connected are provided for, for example, one head body 11. In this embodiment, two wiring films 131 are connected to one actuator 113. The wiring film 131 is, for example, a chip on film (COF) on which the driver IC 132 is mounted.

The driver IC 132 is connected to the plurality of individual electrodes 118 and the common electrode 119 via the wiring film 131. The driver IC 132 may be connected to the plurality of individual electrodes 118 and the common electrode 119 by other means such as an anisotropic paste (ACP), a non-conductive film (NCF), and a non-conductive paste (NCP) instead of the wiring film 131.

The printed wiring board 133 is a printing wiring assembly (PWA) on which various electronic components and connectors are mounted.

The cover 14 includes, for example, an outer shell 141 that covers the side surfaces of the pair of head bodies 11, the manifold unit 12, and the circuit board 13, and a mask plate 142 that covers a part of the pair of head bodies 11 on the nozzle plate 114 side.

The outer shell 141 exposes, for example, the ink supply pipe 123, the ink discharge pipe 124, the temperature control water supply pipe 125 and the temperature control water discharge pipe, and the end portion of the circuit board 13 of the manifold unit 12 to the outside.

The mask plate 142 shown in FIG. 2 covers a portion of the pair of head bodies 11 excluding the plurality of nozzles 1141 and the periphery of the plurality of nozzles 1141 of the nozzle plate 114.

The liquid ejection head 1 configured as described above includes the plurality of individual electrodes 118 that can individually apply a drive voltage to each piezoelectric body 1133, and the common electrode 119 that can apply the drive voltage to all the piezoelectric bodies 1133 on the head body 11.

Therefore, the liquid ejection head 1 can selectively drive the plurality of pressure chambers 1131 individually or in common. Then, if the pressure chamber 1131 is driven, the pressure chamber 1131 undergoes share mode deformation, and the ink supplied into the pressure chamber 1131 is pressurized. Therefore, the liquid ejection head 1 can selectively eject the pressurized ink from the nozzle 1141 facing the pressure chamber 1131.

The common electrode 119 is formed not only on the mounting surface of the actuator 113 of the substrate 111, the inclined surface 1134 of the actuator 113, and the inner surface of the air chamber 1132, but also on the inner peripheral surface of the supply port 1111 formed on the substrate 111.

By providing the common electrode 119 on the inner peripheral surface of the supply port 1111 as well, the liquid ejection head 1 can have a larger electrode surface area for the common electrode 119, and thus the resistance of the common electrode 119 can be reduced. Therefore, even if spacing between rows of the piezoelectric bodies 1133 of the actuator 113 becomes narrower, generation of a difference in ejection performance between the center side and the end portion side in an alignment direction of the nozzles 1141 can be suppressed.

The ink jet printing apparatus 2 including a plurality of liquid ejection heads 1 will now be described with reference to FIG. 9. The ink jet printing apparatus 2 includes a casing 2111, a medium supply unit 2112, an image forming unit 2113, a medium discharge unit 2114, a conveyer 2115, a maintenance device 2117, and a controller 2118. The ink jet printing apparatus 2 includes a temperature control device that adjusts the temperature of ink supplied to the liquid ejection heads 1.

The ink jet printing apparatus 2 is an ink jet printer that performs image forming processing by ejecting ink while conveying, for example, paper P as a recording medium along a conveyance path 2001 from the medium supply unit 2112 through the image forming unit 2113 to the medium discharge unit 2114.

The medium supply unit 2112 includes a plurality of paper feed cassettes 21121. The image forming unit 2113 includes a support portion 2120 that supports paper, and a plurality of head units 2130 that are disposed so as to face each other above the support portion 2120. The medium discharge unit 2114 includes a paper discharge tray 21141.

The support portion 2120 includes a conveyance belt 21201 provided in a loop shape in a predetermined area for which image formation is performed, a support plate 21202 for supporting the conveyance belt 21201 from the back side, and a plurality of belt rollers 21203 provided on the back side of the conveyance belt 21201.

The head units 2130 include the liquid ejection heads 1, a plurality of supply tanks 2132 as liquid tanks mounted on the liquid ejection heads 1, and pumps 2134 for supplying ink, connection flow paths 2135 for connecting the liquid ejection heads 1 and the supply tanks 2132.

In this embodiment, the liquid ejection heads 1 are ink ejection heads of four colors of cyan, magenta, yellow, and black, and the supply tanks 2132 store ink of those four colors. The supply tank 2132 is connected to the liquid ejection head 1 by the connection flow path 2135.

The pump 2134 is a liquid feed pump configured with, for example, a piezoelectric pump. The pump 2134 is connected to the controller 2118 and is driven and controlled by the controller 2118.

The connection flow path 2135 includes a supply flow path connected to the ink supply pipe 123 of the liquid ejection head 1. The connection flow path 2135 includes a recovery flow path connected to the ink discharge pipe 124 of the liquid ejection head 1. For example, if the liquid ejection head 1 is the non-circulating type liquid ejection head, the recovery flow path is connected to the maintenance device 2117, and if the liquid ejection head 1 is the circulating type liquid ejection head, the recovery flow path is connected to the supply tank 2132.

The conveyer 2115 conveys paper P along the conveyance path 2001 from the paper feed cassette 21121 of the medium supply unit 2112 to the paper discharge tray 21141 of the medium discharge unit 2114 through the image forming unit 2113. The conveyer 2115 includes a plurality of guide plate pairs 21211 to 21218 and a plurality of conveyance rollers 21221 to 21228 disposed along the conveyance path 2001. The conveyer 2115 supports paper P so as to be relatively movable to the liquid ejection head 1.

The maintenance device 2117 sucks and recovers ink remaining on the outer surface of the nozzle plate 114 during maintenance, for example. If the liquid ejection head 1 is a non-circulating type liquid ejection head, the maintenance device 2117 recovers ink in the head body 11 during maintenance. Such a maintenance device 2117 includes a tray, a tank, or the like for storing the recovered ink.

The controller 2118 includes a processor such as a CPU (central processing unit) 21181, a memory such as a read only memory (ROM) for storing various programs and a random access memory (RAM) for temporarily storing various variable data and image data, and a network interface circuit for receiving data from the outside and outputting data to the outside.

According to the liquid ejection head 1 and the liquid ejection apparatus 2 configured as described above, by providing the common electrode 119 on the inner peripheral surface of the supply port 1111 which is a long hole, deterioration of print quality can be suppressed even if the common electrode 119 is provided.

Embodiments are not limited to the specific configuration described above and various modifications and variations are contemplated.

For example, in the example described above, a pair of head bodies 11 are provided in the liquid ejection head 1. Alternatively, the liquid ejection head 1 may have one head body 11. Although the above-described head body 11 has a pair of actuators 113, the head body 11 may have a single actuator 113.

In the example described above, in the head body 11, the common electrode 119 is also provided on the inner peripheral surface of the supply port 1111 to increase the electrode surface area of the common electrode 119 in order to reduce the resistance of the common electrode 119, but the head body 11 is not limited to this arrangement.

Figure 10:
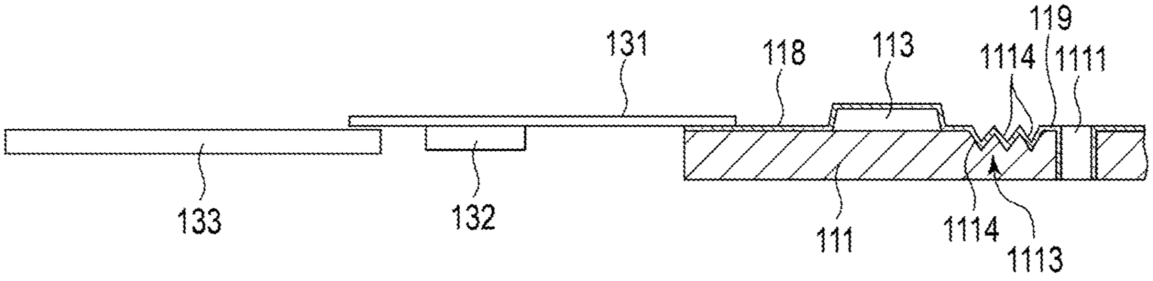
FIG. 10 is a perspective view schematically illustrating a head body of a liquid ejection head according to a second embodiment.
Figure 11:
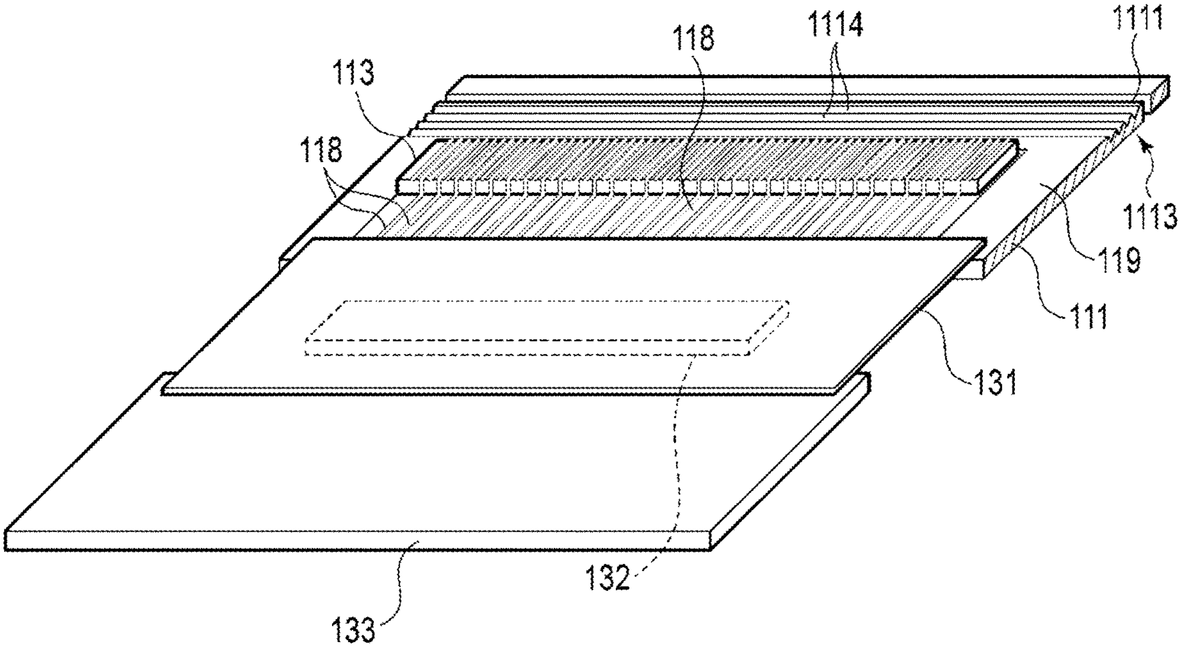
FIG. 11 is a schematic diagram illustrating a head body of a liquid ejection head.

For example, as in a second embodiment illustrated in FIGS. 10 and 11, the head body 11 of the liquid ejection head 1 may have a configuration in which a groove portion 1113 is provided on a surface of the substrate 111, which is a region where the common electrode 119 is formed, between the actuator 113 and supply port 1111. For example, the groove portion 1113 is formed by a plurality of grooves 1114. The groove 1114 extends along the longitudinal direction of the actuator 113, in other words, along the longitudinal direction of the supply port 1111. The plurality of grooves 1114 (e.g., three grooves) are disposed to be aligned in the lateral direction of the actuator 113, for example. The cross-sectional shape of the groove 1114 in the lateral direction is formed in a V shape. That is, a width of the groove 1114 in the lateral direction gradually decreases from an upper end side toward the bottom. The common electrode 119 is also formed on the inclined surface which is the upper surface of the plurality of grooves 1114 formed on the substrate 111.

In the head body 11 of the liquid ejection head 1 according to the second embodiment, the common electrode 119 is formed not only on the inner peripheral surface of the supply port 1111 but also on the upper surfaces of the plurality of grooves 1114. Therefore, the head body 11 can further reduce the resistance of the common electrode 119 by increases in the surface area of the common electrode 119. The head body 11 has a configuration in which the surface area of the substrate 111 is improved by forming the groove portion 1113 in a region where the common electrode 119 is formed on the substrate 111.

Since the groove 1114 can be formed on the substrate 111 by processing a part of the mounting surface of the substrate 111, the surface area of the region where the common electrode 119 is provided can be easily increased. The groove portion 1113 is not limited to the depicted plurality of V-shaped grooves 1114 extending in one direction. For example, the groove portion 1113 may be formed by a plurality of rectangular or conical grooves or recesses. However, in order to form the common electrode 119, the surface of the groove portion 1113 is desirably an inclined surface with respect to the mounting surface of the substrate 111. The number of grooves 1114 is not limited to three and can be set as appropriate.

Although the above-described liquid ejection head 1 is a non-circulating type head, the liquid discharge head 1 may be a circulating type head and have a configuration in which the actuator 113 includes a second pressure chamber, which is for purging and of which an opening on the primary side is connected to the second common liquid chamber 1162, and a third common liquid chamber is included on the secondary side of the second pressure chamber.

By providing the common electrode also on the inner peripheral surface of the supply port, which is a long hole, deterioration of print quality can be suppressed even when a common electrode is used.

The above-described liquid discharge head 1 can apply to various devices other than the ink jet printing apparatus 2. For example, the liquid discharge head 1 can eject liquid including conductive particles for forming a wiring pattern of a printed wiring board.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:
- a plate including a plurality of nozzles arranged along a first direction;
- a substrate on the plate and including a hole extending along the first direction and through which liquid is supplied for ejection from the plurality of nozzles;
- a first actuator on the substrate along the hole and including:
  - a plurality of pressure chambers from which the liquid is supplied from the hole to the nozzles, and
  - a plurality of air chambers, each air chamber disposed between two of the pressure chambers that are adjacent to each other;
- a plurality of individual electrodes, each individual electrode on the substrate and connected to a corresponding one of the pressure chambers;
- a common electrode on the substrate and an inner peripheral surface of the hole; and
- a second actuator on the substrate along the hole, wherein the hole is between the first and second actuators.

2. The liquid ejection head according to claim 1, wherein the liquid is supplied to the first and second actuators through the hole.

3. The liquid ejection head according to claim 1, wherein the substrate includes one or more grooves between the hole and the first actuator and on which a part of the common electrode is provided.

4. The liquid ejection head according to claim 3, wherein the grooves are a plurality of V-shaped grooves arranged along a second direction intersecting the first direction and each extending along the first direction.

5. The liquid ejection head according to claim 1, wherein the hole is at a position corresponding to a center of each of the pressure chambers in a second direction intersecting the first direction.

6. The liquid ejection head according to claim 1, further comprising:
- a manifold on the substrate and including a liquid supply flow path that communicates with the hole.

7. The liquid ejection head according to claim 1, further comprising:
- a frame attached to the substrate by an adhesive, wherein the common electrode is covered by the adhesive.

8. The liquid ejection head according to claim 1, wherein the common electrode is a film of nickel, gold, or copper, and the common electrode has a thickness between 0.5 1Am to 5 μm.

9. The liquid ejection head according to claim 1, wherein the liquid is ink for printing or conductive particles for forming a wiring pattern.

10. A liquid ejection device, comprising:
- a conveyer configured to convey a medium along a conveyance path; and
- a liquid ejection head including:
  - a plate including a plurality of nozzles arranged along a first direction to face the conveyed medium,
  - a substrate on the plate and including a hole extending along the first direction and through which liquid is supplied for ejection from the plurality of nozzles,
  - a first actuator on the substrate along the hole and including:
    - a plurality of pressure chambers from which the liquid is supplied from the hole to the nozzles, and
    - a plurality of air chambers, each air chamber disposed between two of the pressure chambers that are adjacent to each other,
  - a plurality of individual electrodes, each individual electrode on the substrate and connected to a corresponding one of the pressure chambers,
  - a common electrode on the substrate and an inner peripheral surface of the hole, and
  - a second actuator on the substrate along the hole, wherein the hole is between the first and second actuators.

11. The liquid ejection device according to claim 10, wherein the liquid is supplied to the first and second actuators through the hole.

12. The liquid ejection device according to claim 10, wherein the substrate includes one or more grooves between the hole and the first actuator and on which a part of the common electrode is provided.

13. The liquid ejection device according to claim 12, wherein the grooves are a plurality of V-shaped grooves arranged along a second direction intersecting the first direction and each extending along the first direction.

14. The liquid ejection device according to claim 10, wherein the hole is at a position corresponding to a center of each of the pressure chambers in a second direction intersecting the first direction.

15. The liquid ejection device according to claim 10, further comprising:
- a manifold on the substrate and including a liquid supply flow path that communicates with the hole.

16. The liquid ejection device according to claim 10, further comprising:

a frame attached to the substrate by an adhesive, wherein the common electrode is covered by the adhesive.

17. The liquid ejection device according to claim 10, wherein the common electrode is a film of nickel, gold, or copper, and the common electrode has a thickness between 0.5 μm to 5 μm.

18. The liquid ejection device according to claim 10, wherein the liquid is ink for printing or conductive particles for forming a wiring pattern.

* * * * *